(12) United States Patent
Schadt et al.

(10) Patent No.: US 7,364,671 B2
(45) Date of Patent: Apr. 29, 2008

(54) OPTICAL COMPONENT, ORIENTATION LAYER, AND LAYERABLE POLYMERISABLE MIXTURE

(75) Inventors: Martin Schadt, Seltisberg (CH); Hubert Seiberle, Weil am Rhein (DE)

(73) Assignee: Rolic Ltd c/o Rolic Technologies Ltd, Zug (CH)

( * ) Notice: Subject to any disclaimer, the term of this patent is extended or adjusted under 35 U.S.C. 154(b) by 198 days.

(21) Appl. No.: 11/411,028

(22) Filed: Apr. 26, 2006

(65) Prior Publication Data

US 2006/0197068 A1 Sep. 7, 2006

Related U.S. Application Data

(63) Continuation of application No. 09/719,303, filed as application No. PCT/IB99/01001 on Jun. 3, 1999, now abandoned.

(30) Foreign Application Priority Data

Jun. 11, 1998 (GB) ................................. 9812636.0

(51) Int. Cl.
*C09K 19/00* (2006.01)
*C09K 19/52* (2006.01)
*G03F 1/03* (2006.01)

(52) U.S. Cl. ............................... 252/299.1; 252/299.2; 252/299.3; 252/299.4; 252/299.5; 252/299.6; 252/299.7; 252/299.01; 430/20; 430/270.1; 349/176; 428/1.1; 428/1.2

(58) Field of Classification Search ........... 252/299.01, 252/299.1–299.7; 430/20, 270.1; 349/176; 428/1.1, 1.2
See application file for complete search history.

(56) References Cited

U.S. PATENT DOCUMENTS

| | | | |
|---|---|---|---|
| 4,696,990 A | 9/1987 | Noonan et al. | |
| 5,073,294 A | 12/1991 | Shannon et al. | |
| 5,098,975 A | 3/1992 | Omelis et al. | |
| 5,262,882 A | 11/1993 | Hikmet | |
| 5,539,074 A | 7/1996 | Herr et al. | |
| 5,589,237 A | 12/1996 | Akashi et al. | |
| 5,599,478 A | 2/1997 | Matumoto et al. | |
| 5,602,661 A | 2/1997 | Schadt et al. | |
| 5,706,131 A | 1/1998 | Ichimura et al. | |
| 5,730,898 A | 3/1998 | Jin | |
| 6,368,760 B1 | 4/2002 | Nishiguchi | |
| 6,369,869 B2 | 4/2002 | Schadt et al. | |
| 6,844,913 B2 | 1/2005 | Leidig | |

FOREIGN PATENT DOCUMENTS

| | | |
|---|---|---|
| DE | 44 20 585 A1 | 12/1995 |
| DE | 196 00 033 A1 | 7/1996 |
| EP | 0 445 629 A2 | 9/1991 |
| WO | WO 95/34843 | 12/1995 |

OTHER PUBLICATIONS

Chigrinov et al., "Physics and applications of LC photo-alignment: recent results," SPIE, vol. 3318, pp. 454-464 (1998).
Derwent Abstract of DE 4420585, 1995.
Schadt et al., "Photo-Generation of Linearly Polymerized Liquid Crystal Aligning Layers Comprising Novel, Integrated Optically Patterned Retarders and Color Filters," Jpn. J. Appl. Phys., vol. 31, pp. 3240-3249 (1995).
Schadt et al., "Surface-Induced Parallel Alignment of Liquid Crystals by Linearly Polymerized Photopolymers," Jpn. J. Appl. Phys., vol. 31, pp. 2155-2164 (1992).
Schadt et al. "Photo-Induced Alignment and Patterning of Hybrid Liquid Crystalline Polymer Films on Single Substrates," Jpn. J. Appl. Phys., vol. 34, pp. L764-L767 (1995).

*Primary Examiner*—Geraldina Visconti
(74) *Attorney, Agent, or Firm*—Sughrue Mion, PLLC

(57) ABSTRACT

A polymerisable mixture that can be applied as a layer, an orientation layer of the mixture, and an optical component, such as a retarder or a liquid crystal display, having a layer of which the mixture is a precursor.

38 Claims, No Drawings

OPTICAL COMPONENT, ORIENTATION LAYER, AND LAYERABLE POLYMERISABLE MIXTURE

This is a continuation of application Ser. No. 09/719,303, having a § 371(c) filing date of Dec. 11, 2000 now abandoned, the entire contents of which are incorporated by reference, which is a 371 application of PCT/IB99/01001, filed on Jun. 3, 1999, which claims benefit of priority to Application No. 9812636.0, filed on Jun. 11, 1998 in Great Britain This invention relates to a polymerisable mixture which can be applied as a layer, to an orientation layer of the mixture, and to an optical component (such as a retarder or a liquid crystal display) having a layer of which the mixture is a precursor.

Anisotropic transparent or coloured cross-linked polymer layers with three-dimensional orientation of the optical axis, either uniform or preset at individual places are of great interest in many sectors of display technology, integrated optics etc.

For some years, substances having this property in principle have become known, namely certain cross-linkable liquid crystalline diacrylates and diepoxides. Before cross-linking, these substances can be orientated in the liquid crystalline phase in sandwich cells consisting, for example, of glass plates having an interposed monomer layer with the aid of conventional orientating layers on the two glass plate surfaces or under the influence of external fields, e.g. strong magnetic or electric fields and in a second phase can be photo-cross linked in the cells such that the wall forces acting on the two sides of the monomer layer, or the applied fields, preserve the preset orientation during the cross-linking process.

Cross-linked liquid crystalline monomers or oligomers or polymers are also referred to as LCPs (liquid crystal polymers) in the following text.

There have also become known methods which permit the production of orientation layers with locally variable orientating properties.

U.S. Pat. No. 4,974,941 (Gibbons et al.) describes a process wherein a preferred direction is induced in response to exposure with linearly polarised light of an appropriate wavelength by the cis-trans-isomerisation of dyes. Liquid crystals in contact with a surface thus exposed are oriented in accordance with this preferred direction. This orientation process is reversible—i.e., by further exposure of the layer to light of a second polarisation direction the orientation direction can be rotated again.

In the case of the photostructurable orientation layers described in U.S. Pat. No. 5,389,689 (Chigrinov et al.), an irreversible anisotropic polymer network is used. During the exposure to linearly polarised light, anisotropic orienting properties are induced in a photo-polymerisable layer and at the same time a polymer network is built up. Such linear photo-polymerised polymer networks (LPP), also known as photo-oriented polymer networks (PPN), are of use wherever stable, structured or unstructured liquid crystal orientation layers are required.

Layer structures comprising an anisotropic film of LCPs in contact with an orientating layer of a linear photo-polymerised polymer network (LPP) are described in U.S. Pat. No. 5,602,661 (Schadt et al.). The manufacture of these layer structures is effected by orientation of the liquid crystal by interaction with the LPP layer and fixing the orientation in a subsequent cross-linking step. With this technique, it is even possible to manufacture multi-layer structures consisting of several oriented liquid crystal polymer layers, as is shown e.g. in European Application No. 0 689 084 (Schadt et al.).

As is well known, in addition to an azimuthal alignment, a tilt angle, i.e. an inclination of the optical axis of the liquid crystal layer relative to the plane of the layer, is often necessary. This can be achieved by an LPP orientation layer having a tilt angle on the surface, disclosed e.g. in European Application No. 0 756 193 (Schadt et al.).

To sum up, it can be said that LCP layers, usually in combination with orientation layers, are the basis of a large number of optical components like retarders, optical filters, polarizer etc. Layer structures of the type mentioned above with locally varying optical axes can also be used as a safeguard against counterfeiting and copying, as disclosed for example by European Application No. 0 689 065 (Schadt et al.).

Furthermore, it is well known to the artisan and understood in the present context that orientation layers are not only used for producing LCP components but also for aligning liquid crystals in liquid crystal displays, light valves etc.

The present invention provides and opens up new possibilities both for optical components, particularly of the aforementioned kind, and for liquid crystal orientation layers.

According to the invention, a polymerisable mixture comprises
 (i) a liquid crystal monomer or pre-polymer having cross-linkable groups; and
 (ii) a photo-orientable monomer or oligomer or polymer.

Despite the distinct functions of the participating molecules, it has been surprisingly discovered that these mixtures are capable of being both oriented and cross-linked into a liquid crystal polymer. These fixtures are hence usable on the one hand as anisotropic layers in optical components or on the other hand, normally applied more thinly, as orientation layers.

This leads to various advantages hitherto unavailable.

In the case of an anisotropic layer for an optical component, only one layer need be applied instead of the hitherto necessary two, thus reducing the number of processing steps.

In the case of an orientation layer, the orientation proceeds not only at the surface of the layer but can proceed throughout its depth.

It is no longer necessary to apply and appropriately (e.g. imagewise) expose or irradiate an e.g. patterned orientation layer before the LCP layer is applied, in other words the entire layer-applying stage can be completed before the exposure/irradiation stage. These stages can be performed quite independently and even at separate locations. This is an important benefit for security purposes, where a secret alignment pattern is to be imposed on an LPP layer; the manufacturer who applies the LPP layer does not (as hitherto) need to be given the secret pattern, which improves the safeguards against counterfeiting.

Varying the types and proportions of the various chemical components of the mixtures according to the invention is a useful tool for influencing properties such as viscosity and coatability of the mixtures; for example an unacceptable coalescence into globules of an applied layer of such a mixture can be inhibited by increasing its viscosity.

By "photo-orientable" is meant that the substance (ii) is capable of developing a preferred direction when irradiated with linearly polarised light and thus inducing an alignment of liquid crystals.

It is understood that substance (i) may also be an LCP mixture, i.e. may contain two or more different liquid crystal molecule types. Equally, substance (ii) may be a mixture of photo-orientable molecules.

Assuming that the cross-link able liquid crystal substance (i) is present in an amount of 100 parts, the photo-orientable substance (ii) preferably is present in an amount of at least 0.1 part, more preferably of at least 1 part, most preferably of at least 10 parts.

A preferred photo-orientable substance (ii) comprises molecules showing a cis-trans-isomerism, particularly azo dyes.

Another preferred photo-orientable substance (ii) comprises a linearly photo-polymerisable monomer or oligomer or polymer.

Depending on the intended application, the cross-linkable liquid crystal substance (i) may have a nematic phase or cholesteric phase or a ferroelectric phase respectively.

The substance(s) (i) is/are preferably acrylate or diacrylate.

In a preferred embodiment of the invention, the mixture further comprises chiral molecules.

In another preferred embodiment, the mixture further comprises dye molecules.

In another preferred embodiment, the mixture further comprises dichroic molecules.

In another preferred embodiment, the mixture further comprises fluorescent molecules.

A presensitised film precursor according to the invention comprises a substrate (such as a plastic film) carrying a layer (e.g. 0.1 to 5 microns thick) of a mixture as set forth above.

Such a precursor can be manufactured in industrial-sized rolls and transported to the end user (in the dark). The applied layer should be able to withstand the rigours of transport, especially if protected by a peel-off layer.

A substrate carrying a layer of a mixture according to the invention, for many applications, should be conductive under the layer.

An optical component according the invention comprises a layer of a mixture as set forth above, in which the liquid crystal monomer or pre-polymer is at least partly polymerised. Such a layer usually will be optically anisotropic.

Preferably, the layer has a preferred orientation direction or locally varying preferred orientation directions, which may be at an angle to the plane of the substrate, in other words with a tilt angle.

The thickness of the layer will depend on the use. Thus, for an optical component intended to be used in its own right, such as for instance a retarder, an optical filter, a polarizer or a polarised light emitter, a relatively thick layer, e.g. 0.3 to 5 µm, is preferred. For a layer which is intended to act as an orientation layer without significant inherent optical properties, a thinner coating such as 0.01 to 1 µm is preferred. Although photo-orientable compounds, particularly LPP compounds, can be used by themselves as orientation layers, the LCP compounds may advantageously confer networking forces retaining the preferred direction in the photo-orientable compounds.

A method according to the invention of making an at least partly polymerised, optically anisotropic layer of a mixture as set forth above comprises exposing the mixture (preferably in its isotropic phase, e.g. by warming it) to linearly polarised light (optionally in different orientations in different parts of the layer, for example in imagewise, patternwise and pixellated arrangement) while maintaining such conditions that the polymerisation or cross-linking of substance (i) is essentially inhibited, whereby at least some of the molecules of the substance (ii) are photo-oriented. Initially, the molecules of substance (i), i.e. the liquid crystal prepolymers, must not cross-link. However, once they have adopted the preferred orientation, and there is an adequate proportion of substance (ii) photo-oriented for this eventually to occur spontaneously, the molecules of substance (i) may be polymerised or cross-linked with (polarised or non-polarised) light in the anaerobic conditions (e.g. by purging oxygen with a flow of nitrogen or by vacuum). The differential polymerisation of (ii) then (i) may alternatively be achieved by different wavelengths of exciting radiation, though the preferred method remains adjustment of the oxygen partial pressure.

According to the incident angle of the polarised light, a tilt angle can be built in which the liquid crystal molecules will adopt.

Under special conditions, the method may be modified in that the light used for the photo-alignment need not be polarised. If for example the layer is in a cholesteric phase, where the liquid crystal molecules organise themselves in a helical conformation, an alignment of the axes of the helices may be induced by the direction of the incident light.

The invention will now be described by way of example.

EXAMPLE 1

Making a Solution of an LPP (Linear Photopolymerisable Polymer)/LCP (Liquid Crystal Polymer) Mixture The following photocrosslinkable substances were used to make the LPP/LCP mixture, of which the LCP components, denoted Mon1, Mon2 and Mon3, are crosslinkable diacrylate monomers:

Mon 1:

-continued

Mon 2:

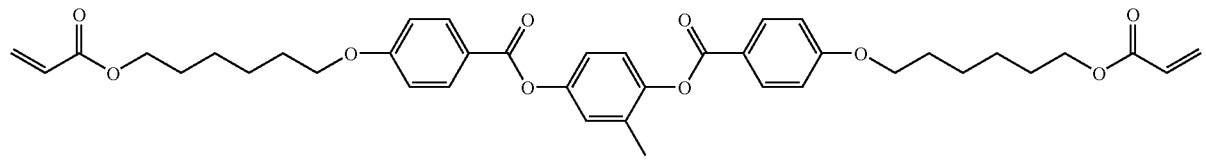

Mon 3:

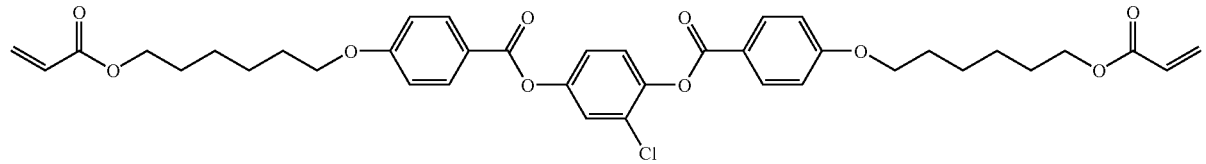

LPP A:

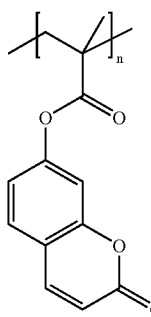

LPP A was made as described in PCT Publication WO96/10049 Example 1.

Then an LPP/LCP mixture M1 was made from:
54.4 wt %=224.0 mg of Monomer 1
10.2%=42.2 mg of Monomer 2
3.4%=14.2 mg of Monomer 3
29.2%=120.2 mg of LPP A
1.4%=5.6 mg of a photoinitiator (Irgacure (trade mark) 369 by CIBA), and
1.4%=5.6 mg of BHT (butyl hydroxy toluene) as an inhibitor.

A 5 wt % solution of the mixture M1 was made in N-methyl-pyrrolidone (NMP), then stirred for 30 minutes at 50 C, and filtered through a 0.21 µm filter.

EXAMPLE 2

Making an Orientation Layer

The solution from Example 1 was thinly spin-coated at 2000 rpm onto two ITO (indium-tin-oxide) coated glass plates, which were then dried for 30 minutes at 130 C on a hotplate.

The dried plates were warmed to 75 C and irradiated for 6 minutes under ultraviolet polarised light from a 200 W mercury high pressure lamp and having an incident angle of 70°. In this procedure, the direction of polarisation of the light lay in the plane perpendicular to the plate and including the incident light direction. The polariser was a film polariser HNP'B by Polaroid. The wavelength of the light was further limited by a uv filter WG295 (Schott) and a bandpass filter UG11 (Schott). The intensity of the uv light at the plate was determined as 2 mW/cm$^2$.

After this irradiation, the layers were cooled at 1 C/min to 65 C, then at 5 C/min to 50 C.

The layers were still liquid.

The layers were then irradiated for ten minutes under nitrogen at room temperature by isotropic (not-polarised) light from a mercury lamp at an intensity in the ultraviolet of 4.1 mW/cm$^2$. Because of the presence of intervening glass (containing the nitrogen), the incident light no longer included wavelengths below 350 nm, which the glass had absorbed.

After this irradiation, the layers were no longer liquid but had become cross-linked.

EXAMPLE 3

Making a Parallel-sided Cell

With the coated sides facing inwards, the two plates from Example 2 were assembled into a parallel-sided cell, using a glass fibre of 20 µm thickness as a spacer. The cell was immediately filled with a nematic liquid crystal mixture MLC 12000-000 (Merck) at a temperature only just above the liquid crystal-isotropic transition temperature (considered to be 89 C in this case), and slowly cooled.

Holding the filled cell between crossed polarisers showed that the liquid crystal mixture was uniformly oriented. Using a tilt compensator and a polarisation microscope, the orientation direction which the coated plates had imposed on the nematic liquid crystal mixture was established to be parallel to the direction of polarisation of the uv light which had irradiated the plates.

The rotating crystal technique showed that the tilt angle adopted by the liquid crystal was a hefty 25°.

EXAMPLE 4

Making a Solution of an LPP (Linear Photopolymerisable Polymer)/LCP (Liquid Crystal Polymer) Mixture Example 1 was repeated, except that a 25 wt. % solution of mixture M1 in NMP was used.

EXAMPLE 5

Coating a Glass Plate

The solution from Example 4 was spin-coated at 1500 rpm onto a glass plate, which was then dried for 10 minutes at 130 C on a hotplate. Observation through a polarisation microscope showed that the resulting layer was liquid crystalline but had no preferred orientation. Using a polarising microscope with a hotplate (Mettler FP5) the liquid crystal-isotropic transition temperature; was measured as Tc=69 C.

EXAMPLE 6

Making an Optical Retarder Layer

The layer from Example 5 was warmed to 75 C and irradiated for 3 minutes under ultraviolet polarised light from a 200 W mercury high pressure lamp. The polariser was a film polariser HNP'B by Polaroid. The wavelength of the light was further limited by a uv filter WG295 (Schott) and a bandpass filter UG11 (Schott). The intensity of the uv light at the plate was determined as 2 mW/cm$^2$.

After this irradiation, the layer was cooled at 1 C/min to 65 C, then at 5 C/min to 50 C. The layer was then removed from the hotplate and placed between crossed polarisers. The layer was now uniformly oriented. On rotating the substrate, it appeared, alternately, wholly dark or wholly light. Touching it established that the layer was still liquid.

The layer was then irradiated for ten minutes under nitrogen at room temperature by isotropic (not-polarised) light from a mercury lamp at an intensity in the ultraviolet of 4.1 mW/cm$^2$. Because of the presence of intervening glass (containing the nitrogen), the incident light no longer included wavelengths below 350 nm, which the glass had absorbed.

After this irradiation, the layer was no longer liquid but had become firm and cross-linked. Its thickness was 670 nm.

Using a tilt compensator and a polarisation microscope, the layer was found to have an optical retardation of 52.5 nm. It was also established that the orientation of the optical axis all over the layer was parallel to the polarisation direction chosen in the first ultraviolet irradiation.

EXAMPLE 7

Optical Retarder Layer with Tilted Optical Axis

Example 5 was repeated. Before irradiation, the lower half of the glass plate was covered and the plate rotated 70° about an axis perpendicular to the plane containing the direction of incident light and its direction of polarisation. During irradiation with linearly polarised light, the temperature of the glass plate was held constant at 75 C, just as in Example 6. The duration of irradiation was selected to be six minutes, as the effective intensity of the light on the layer was reduced by the rotation of the glass plate.

After this first irradiation, the glass plate was rotated in the opposite direction so that the normal to the substrate surface now made an angle of −70° with the incident direction of the light. Also, now only the upper half of the plate was covered (so that each half of the plate had only one irradiation). There now followed a second six-minute irradiation, of only the exposed lower half of the plate.

Thereafter, as in Example 6, the coating was slowly cooled and, again as in Example 6, was crosslinked under nitrogen with isotropic ultraviolet light.

On observing the layer through crossed polarisers, a uniform orientation was apparent, leading to alternate lightening and darkening as the layer was rotated. Using a tilt compensator it was established, as in Example 6, that the optical axis was parallel to the plane of polarisation of the linearly polarised ultraviolet light.

The substrate was then so disposed between crossed polarisers that the optical axis made an angle of 45° with the directions of polarisation. On tilting the substrate about an axis which was in the plane of the layer but perpendicular to the optical axis, it could be seen that one half of the layer became darker and the other lighter. Reversing the tilt reversed and inverted the effect.

By obliquely illuminating with linearly polarised light, the molecules of the layer were preferentially orientated at an angle to the substrate surface, whereby the optical axis was established with a tilt with respect to the surface.

The invention claimed is:

1. A method of making an at least partly polymerised, optically anisotropic layer of a mixture, said mixture comprising at least the following two components
   (i) a liquid crystal monomer or pre-polymer having cross-linkable groups; and
   (ii) a photo-orientable monomer or oligomer or polymer that, when photo-oriented, induces an alignment of the liquid crystal monomer or pre-polymer
   said method comprising the steps of
   (a) exposing the mixture to linearly polarised light while maintaining such conditions that the polymerisation or cross-linking of substance (i) is essentially inhibited, whereby at least some of the molecules of the substance (ii) are photo-oriented; and
   (b) allowing substance (i) to adopt the imposed orientation(s) and exposing the mixture to light, whereby at least some of the molecules of the substance (i) are polymerised or cross-linked.

2. A method according to claim 1, wherein during step (a) the mixture is maintained in its isotropic phase.

3. A method according to claim 1, wherein during step (a) the mixture is exposed to light of different directions of polarisation in different parts.

4. A method according to claim 1, wherein said mixture is dissolved in a solvent, and prior to step (a) a layer is formed and dried.

5. A method according to claim 1, wherein in step (a) aerobic conditions are provided and in step (b) anaerobic conditions are provided.

6. A method according to claim 1, wherein in step (a) different wavelengths are used than during step (b).

7. A method according to claim 1, wherein in said mixture the cross-linkable liquid crystal substance (i) is present in an amount of 100 parts, and the photo-orientable substance (ii) is present in an amount of at least 0.1 part.

8. A method according to claim 7, wherein the photo-orientable substance (ii) is present in an amount of at least 1 parts.

9. A method according to claim 7, wherein the photo-orientable substance (ii) is present in an amount of at least 10 part.

10. A method according to claim 1, wherein the photo-orientable substance (ii) comprises molecules showing a cis-trans-isomerism.

11. A method according to claim 1, wherein the photo-orientable substance (ii) comprises a linearly photo-polymerisable monomer or oligomer or polymer.

12. A method according to claim 1, wherein the cross-linkable liquid crystal substance (i) has a nematic phase.

13. A method according to claim 1, wherein the cross-linkable liquid crystal substance (i) has a cholesteric phase.

14. A method according to claim 1, wherein the cross-linkable liquid crystal substance (i) has a ferroelectric phase.

15. A polymerisable mixture comprising
   (iii) a liquid crystal monomer or pre-polymer having cross-linkable groups; and
   (iv) a photo-orientable monomer or oligomer or polymer.

16. A mixture according to claim 15, wherein the cross-linkable liquid crystal substance (i) is present in an amount of 100 parts, and the photo-orientable substance (ii) is present in an amount of at least 0.1 part.

17. A mixture according to claim 15, wherein the photo-orientable substance (ii) is present in an amount of at least 1 parts.

18. A mixture according to claim 16, wherein the photo-orientable substance (ii) is present in an amount of at least 10 part.

19. A mixture according to claim 15, wherein the photo-orientable substance (ii) comprises molecules showing a cis-trans-isomerism.

20. A mixture according to claim 19, wherein the photo-orientable substance (ii) comprises azo dyes.

21. A mixture according to claim 15, wherein the photo-orientable substance (ii) comprises a linearly photo-polymerisable monomer or oligomer or polymer.

22. A mixture according to claim 15, wherein the cross-linkable liquid crystal substance (i) has a nematic phase.

23. A mixture according to claim 15, wherein the cross-linkable liquid crystal substance (i) has a cholesteric phase.

24. A mixture according to claim 15, wherein the cross-linkable liquid crystal substance (i) has a ferroelectric phase.

25. A mixture according to claim 15, wherein the cross-linkable liquid crystal substance (i) is or comprises acrylate or diacrylate.

26. A mixture according to claim 15, further comprising chiral molecules.

27. A mixture according to claim 15, further comprising dye molecules.

28. A mixture according to claim 15, further comprising dichroic molecules.

29. A mixture according to claim 15, further comprising fluorescent molecules.

30. A presensitised film precursor, comprising a substrate carrying a layer made using a method according to claim 1.

31. A substrate having an electrically conductive surface which carries a layer made using a method according to claim 1.

32. An optical component comprising an at least partly polymerised layer made using a method according to claim 1.

33. An optical component according to claim 32, wherein the layer is optically anisotropic.

34. An optical component according to claim 32, wherein the layer is polymerised with a preferred orientation direction.

35. An optical component according to claim 34, wherein the layer is polymerised with locally varying preferred orientation directions.

36. An optical component according to claim 32, wherein the layer has the function of an orientation layer.

37. An optical component according to claim 32, wherein the layer has the function of a retarder or an optical filter or a polarizer or a polarised light emitter.

38. An optical component according to claim 32, wherein the layer has the function of an orientation layer as well as a retarder or an optical filter or a polarizer, or a polarised light emitter.

* * * * *